US010569198B2

(12) United States Patent
Kulkarni et al.

(10) Patent No.: US 10,569,198 B2
(45) Date of Patent: Feb. 25, 2020

(54) FLUID SEPARATOR

(71) Applicant: Eaton Corporation, Cleveland, OH (US)

(72) Inventors: Aniruddha M. Kulkarni, Pune (IN); Jubin T. George, Pune (IN); Stephen Showalter, Milmont Part, PA (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 92 days.

(21) Appl. No.: 15/637,485

(22) Filed: Jun. 29, 2017

(65) Prior Publication Data
US 2018/0021701 A1 Jan. 25, 2018

(30) Foreign Application Priority Data
Jul. 19, 2016 (IN) .............................. 201611024750

(51) Int. Cl.
B01D 21/26 (2006.01)
B01D 19/00 (2006.01)
B01D 17/02 (2006.01)
F01M 13/04 (2006.01)
B04C 5/181 (2006.01)
B04C 5/08 (2006.01)

(52) U.S. Cl.
CPC ....... B01D 21/267 (2013.01); B01D 17/0217 (2013.01); B01D 19/0057 (2013.01); B01D 19/0094 (2013.01); B04C 5/08 (2013.01); B04C 5/181 (2013.01); F01M 13/04 (2013.01)

(58) Field of Classification Search
CPC .............. B01D 21/267; B01D 19/0094; B01D 19/0057; B01D 17/0217; F01M 13/04; B04C 5/08; B04C 5/181
See application file for complete search history.

(56) References Cited

U.S. PATENT DOCUMENTS

| 3,232,430 | A | * | 2/1966 | Saint-Jacques | ........... B04C 5/08 209/138 |
| 3,613,887 | A | * | 10/1971 | Wikdahl | ................... B04C 5/12 209/732 |
| 4,895,582 | A | | 1/1990 | Bielefeldt | |
| 6,024,874 | A | | 2/2000 | Lott | |
| 6,312,594 | B1 | | 11/2001 | Conrad et al. | |

(Continued)

OTHER PUBLICATIONS

European Search Report—EP17181757, dated Nov. 22, 2017.

Primary Examiner — Liam Royce
(74) Attorney, Agent, or Firm — Fishman Stewart PLLC

(57) ABSTRACT

A fluid separator includes a body, an inlet, a first outlet and/or a second outlet. The first outlet may include a vortex finder that may have a convergent-divergent configuration. The second outlet may include or may be connected to a pressure relief valve. At least a portion of the pressure relief valve may be disposed in the vortex finder. The pressure relief valve may be disposed entirely outside of the vortex finder. The vortex finder may include a divergent section and a convergent section. In embodiments, the divergent section may be at least twice as long as the convergent section, a taper angle of the convergent section may be at least twice as large as a taper angle of the divergent section, and/or an axial length of a portion of the vortex finder extending into the body may be at least 1.5 times a diameter of the inlet.

20 Claims, 5 Drawing Sheets

(56) References Cited

U.S. PATENT DOCUMENTS

| | | | |
|---|---|---|---|
| 6,425,931 B1* | 7/2002 | Croggon | A47L 9/0081 |
| | | | 55/414 |
| 6,596,169 B1* | 7/2003 | Rong | B04C 5/04 |
| | | | 209/719 |
| 7,288,138 B2 | 10/2007 | Showalter et al. | |
| 2006/0107837 A1* | 5/2006 | Showalter | B01D 19/0057 |
| | | | 96/208 |
| 2009/0314161 A1 | 12/2009 | Al-Alusi et al. | |

* cited by examiner

FLUID SEPARATOR

CROSS-REFERENCE TO RELATED APPLICATIONS

This application claims the benefit of Indian Patent Application Serial No. 201611024750, filed Jul. 19, 2016, the disclosure of which is hereby incorporated herein by reference in its entirety.

TECHNICAL FIELD

The present invention relates to devices for separating debris particles and gas from fluids in machinery, such as lubricants in an engine, and may include devices that perform such a separation by creating a fluid vortex.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Various machines and system are lubricated with a lubricating liquid, such as oil. As lubricating liquid flows through a system, it may become aerated (e.g., as a result of turbulent flow) and/or pick up debris particles. In some applications, a fluid separator may be used to separate the oil from the gas/air and/or debris particles. An example of a fluid separator is described in U.S. Pat. No. 7,288,138, which is owned by the assignee of the instant application and is hereby incorporated by reference as though fully set forth herein.

Some fluid separators may experience low efficiency at high gas/liquid ratios (e.g., high air/oil ratios).

There is therefore a desire for solutions/options that minimize or eliminate one or more of the above-described challenges. The foregoing discussion is intended only to illustrate the present field and should not be taken as a disavowal of scope.

SUMMARY

In embodiments, a fluid separator may include a body, an inlet, a first outlet and/or a second outlet. The first outlet may include a vortex finder that may have a convergent-divergent configuration. The inlet and the second outlet may be disposed at a first end of the body and the first outlet may be disposed at a second end of the body. The second outlet may include or may be connected to a pressure relief valve. At least a portion of the pressure relief valve may be disposed in the vortex finder. The pressure relief valve may be disposed entirely outside of the vortex finder. The vortex finder may include a divergent section and a convergent section connected to the divergent section. The divergent section may be at least twice as long as the convergent section. The divergent section may be at least three times as long as the convergent section. A maximum inner diameter of the convergent section may be substantially the same as a maximum inner diameter of the divergent section. A taper angle of the convergent section may be at least twice as large as a taper angle of the divergent section. An axial length of a portion of the vortex finder extend into the body may be at least 1.5 times as large as a diameter of the inlet. A maximum diameter of the divergent section may be no more than 20% larger than a length of the divergent section and may be at least 80% as large as the length of the divergent section. The inlet may be tangentially connected to the body.

In embodiments, a method of separating fluid may include providing a fluid separator having an inlet, a first outlet, and/or a second outlet. The first outlet may include a vortex finder that may have a convergent-divergent configuration. The method may include providing a combined fluid to the inlet and/or separating a gas from a liquid of the combined fluid such that the gas flows into a divergent section of the vortex finder and the liquid flows to the second outlet. Gas may flow from the divergent section of the vortex finder to a convergent section of the vortex finder. Separating the gas from the liquid may be at least 99% efficient. The method may include at least one of restricting and redirecting flow of the combined fluid via the divergent section of the vortex finder. Separating the gas from the liquid may include creating a column of the gas. The method may include restricting flow of the combined fluid to the column of the gas via the divergent section of the vortex finder. A length of a portion of the vortex finder disposed in a body of the fluid separator may be at least 1.5 times longer than a diameter of the inlet. A taper angle of the convergent section may be at least twice as large as a taper angle of the divergent section.

The foregoing and other aspects, features, details, utilities, and advantages of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the disclosure will be described in conjunction with embodiments and/or examples, it will be understood that they are not intended to limit the present disclosure to these embodiments and/or examples. On the contrary, the present disclosure is intended to cover alternatives, modifications and equivalents, which may be included within the spirit and scope of the present disclosure.

Figure 1A:
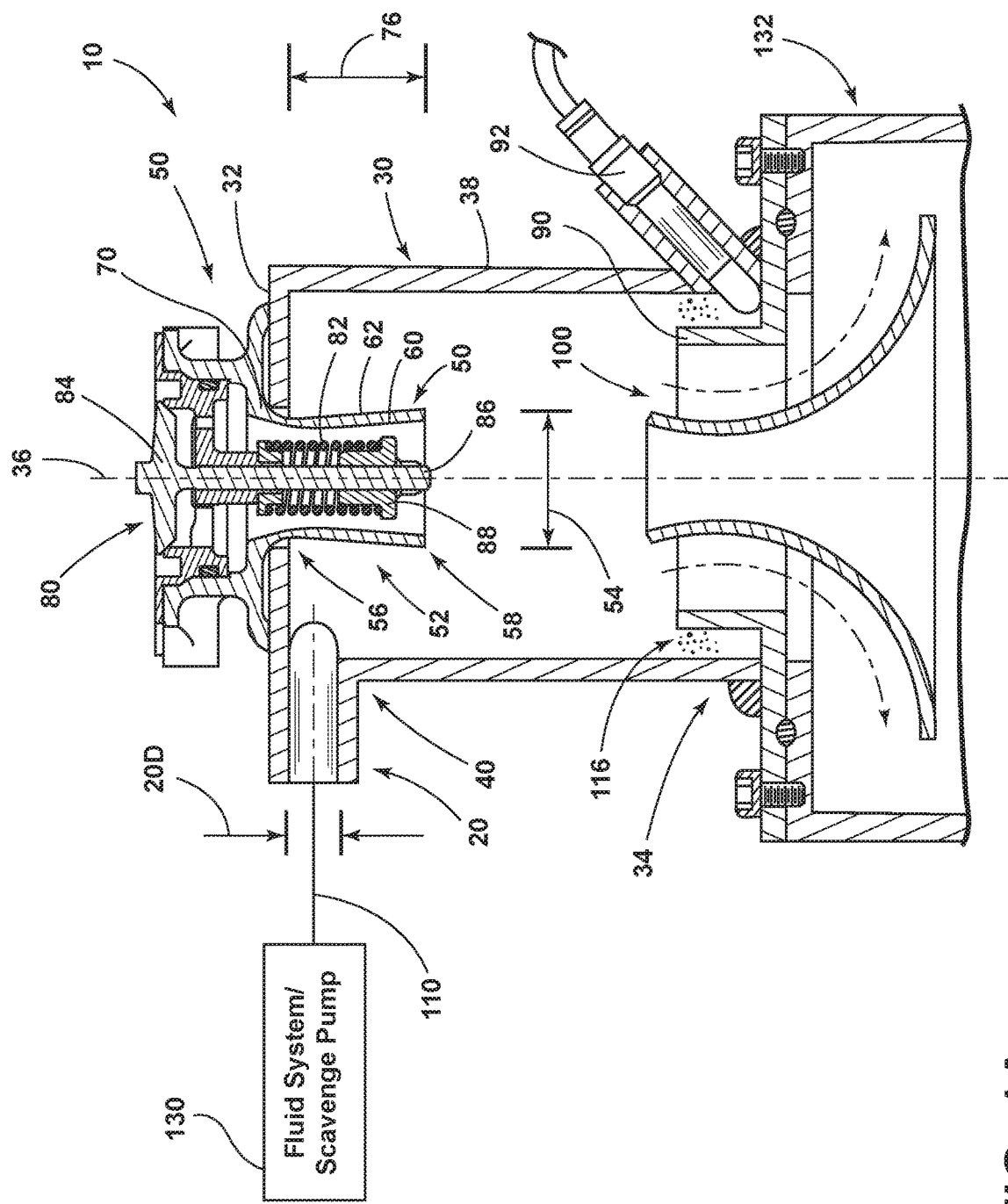
FIG. 1A is a cross-sectional view generally illustrating an embodiment of a fluid separator according to teachings of the present disclosure.
Figure 1B:
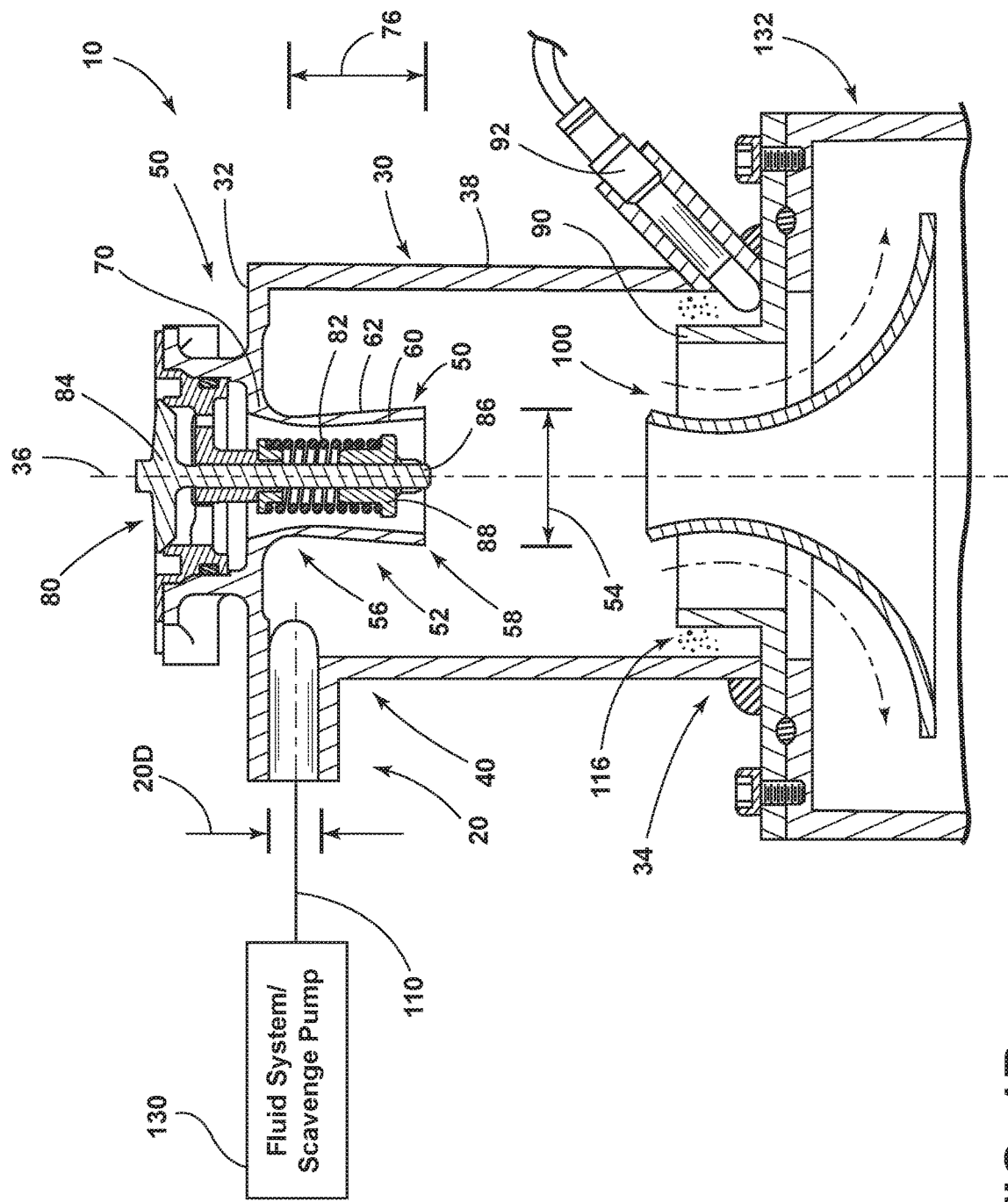
FIG. 1B is a cross-sectional view generally illustrating an embodiment of a fluid separator according to teachings of the present disclosure.

In embodiments, such as generally illustrated in FIGS. 1A and 1B, a fluid separator 10 may include an inlet 20, a body 30, a first outlet 50, a particle ring 90, debris sensor 92, and/or a second outlet 100. Fluid separator 10 may be configured as a cyclone and/or vortex separator. Body 30 may provide fluid communication between inlet 20, first outlet 50, and/or second outlet 100. Body 30 may include, for example, a generally cylindrical shape. Inlet 20 and/or first outlet 50 may be disposed at and/or connected to a first end/top 32 of body 30. For example and without limitation, inlet 20 may be connected at or about a top end 40 of a side wall 38 of body 30 and first outlet 50 may be connected to and/or integrated with a top 32 (e.g., an end wall) of body 30. Second outlet 100 may be disposed at and/or connected to a second end 34 (e.g., a bottom) of body 30. Body 30 may include a central axis 36. First outlet 50 and/or second outlet 100 may be aligned with (e.g., centered on) axis 36.

With embodiments, inlet 20 may be connected to a fluid system 130 and a combined fluid 110 may be received via inlet 20. Combined fluid 110 may include a liquid 112, a gas 114, and/or debris particles 116, such as, for example, aerated lubrication oil with metal debris particles 116. Inlet 20 may be connected to body 30 such that combined fluid 110 may enter body 30 and flow in a helical/vortex pattern toward second outlet 100. For example and without limitation, inlet 20 may be tangentially connected to body 30 such that combined fluid 110 may enter body 30 in a generally circumferential direction about axis 36 (e.g., not a radial direction).

Figure 2:
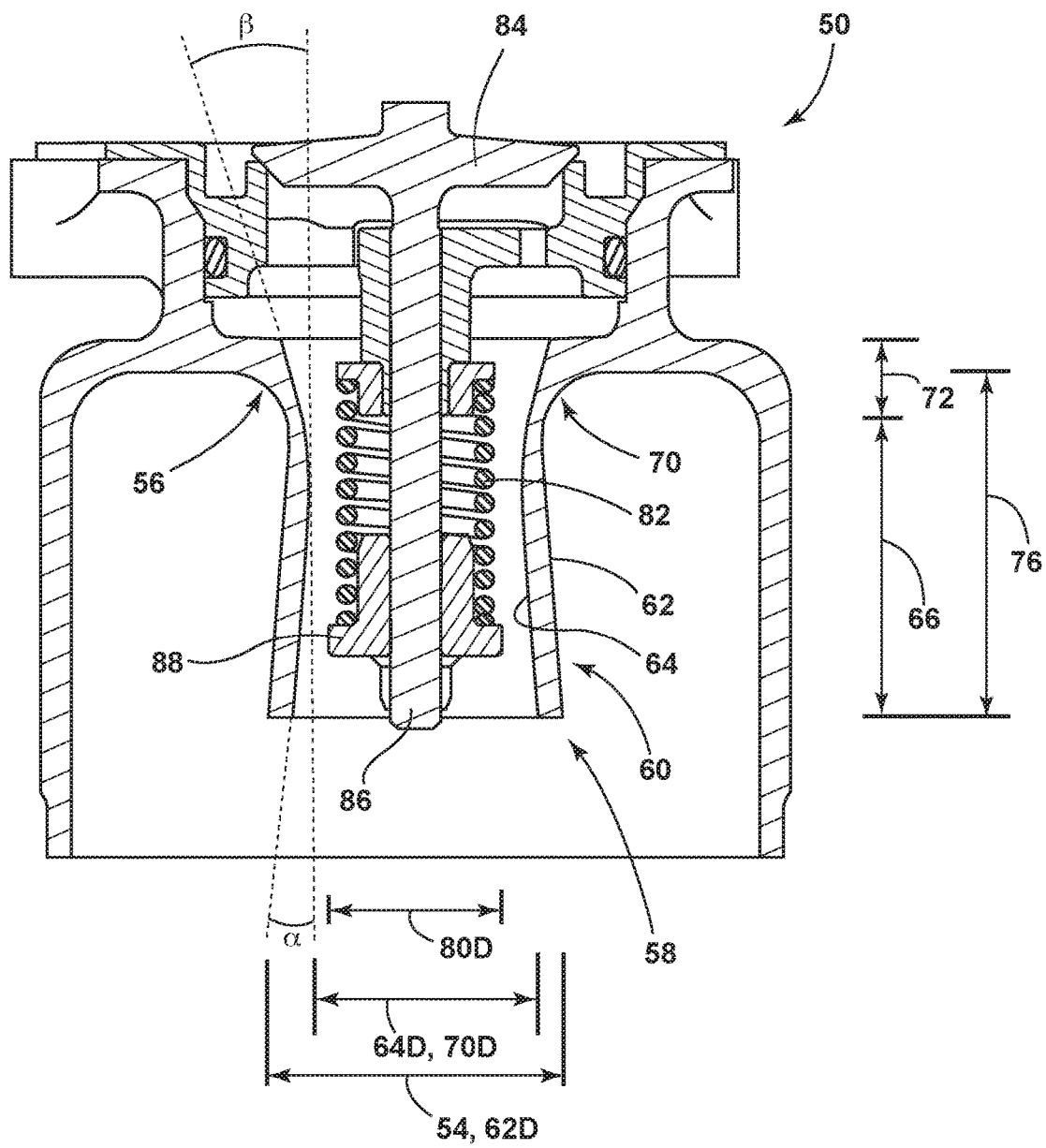
FIG. 2 is a cross-sectional view generally illustrating portions of an embodiment of a fluid separator according to teachings of the present disclosure.

With embodiments, such as generally illustrated in FIGS. 1A, 1B, and 2, first outlet 50 may be configured to provide an outlet for gas or air 114. First outlet 50 may include one or more of a variety of shapes, sizes, and/or configurations. First outlet 50 may, for example, be configured as and/or referred to as a vortex finder 50. Combined fluid 110 may enter inlet 20 and may swirl within body 30. As combined fluid 110 swirls within body 30, lubricating liquid 112 may move toward an outer wall 38 of body 30 (e.g., lubricating liquid 112 may be denser than gas/air 114). As lubricating liquid 112 moves toward outer wall 38, a central core 120 may be formed that may include primarily gas/air 114. Lubricating liquid 112 may flow (e.g., along outer wall 38) toward second outlet 100. Gas/air 114 of central core 120 may flow to first outlet/vortex finder 50. While first outlet 50 may be configured to provide an outlet for gas or air 114, liquid 112 may exit through first outlet 50 in some circumstances.

Figure 3:
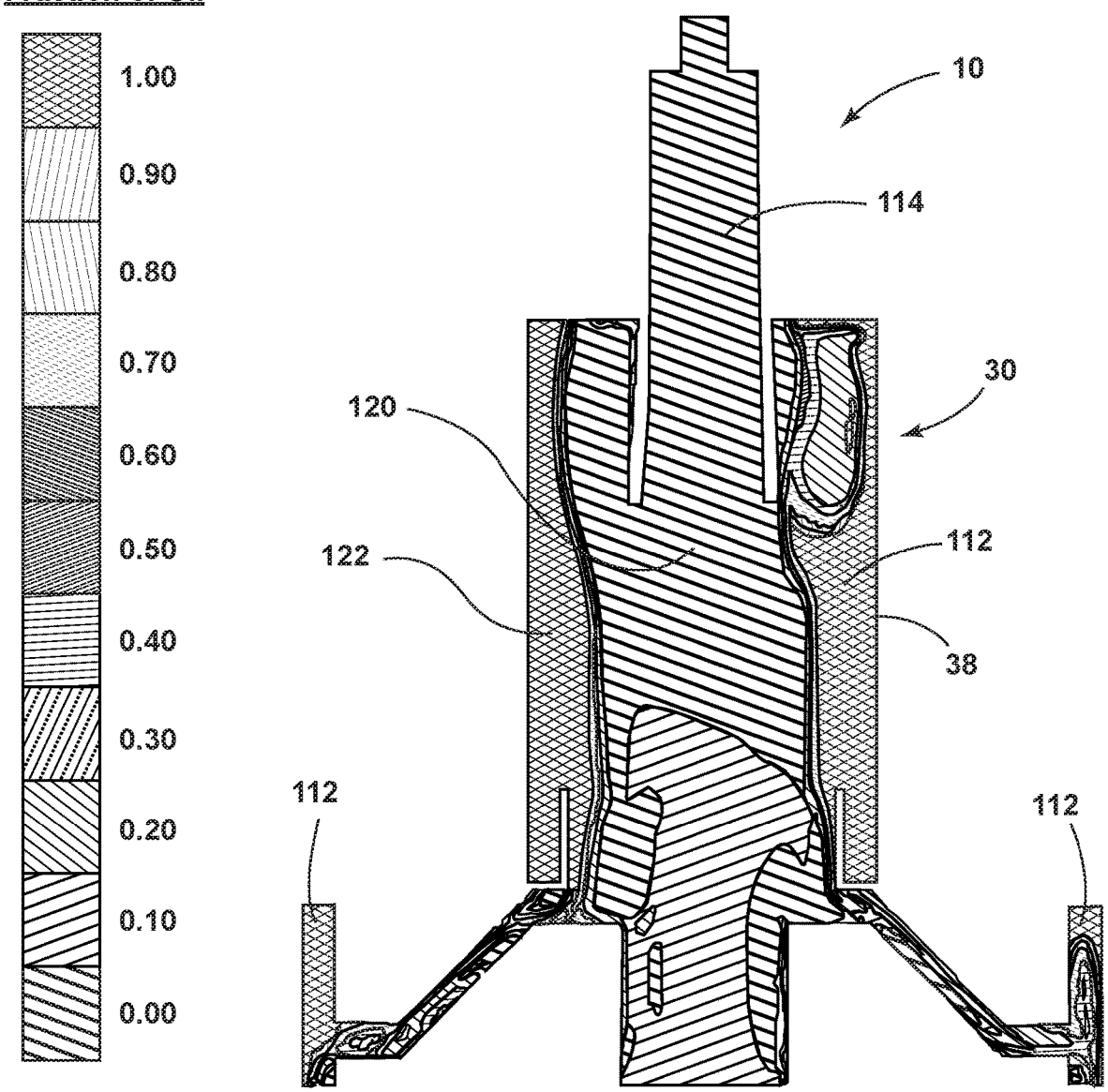
FIG. 3 is a cross-sectional view generally illustrating flow physics of portions of an embodiment of a fluid separator according to teachings of the present disclosure.

With embodiments, such as generally illustrated in the flow analysis shown in FIG. 3, central air core 120 may be formed at or about the center of body 30. A percentage/fraction of oil 112 (e.g., relative to air 114) present in portions of an embodiment of a fluid separator 10 is generally illustrated in FIG. 3. Liquid 112 (e.g., oil) that moves toward outer wall 38 may form a liquid column 122 that may at least partially surround and/or flow around central air core 120. For example and without limitation, a liquid column 122 may include a generally cylindrical tube shape. Liquid 112 (e.g., in liquid column 122) may flow along outer wall 38. Formation of central air core 120 and liquid column 122 may provide/facilitate a desired separation of liquid 112 and gas 114 (e.g., oil and air). Embodiments of the present disclosure may exhibit an oil-air separation efficiency improvement relative to other designs. In embodiments, such as those that include a vortex finder 50, separation efficiency may be improved to 99% or more. Separation efficiency may correspond, for example, to an amount of liquid 112 present in the fluid that exits body 30 through first outlet 50 (e.g., a 99% efficiency may correspond to fluid exiting first outlet 50 including 1% or less of oil 112 and including 99% or more of air 114).

In embodiments, vortex finder 50 may include a receiving portion 52 that may extend into body 30. Receiving portion 52 may include one or more of a variety of shapes, sizes, and/or configurations. Receiving portion 52 may include a convergent configuration, a divergent configuration, and/or convergent-divergent configuration. For example and without limitation, receiving portion 52 may include a first section 60 and/or a second section 70. First section 60 may include a tapered configuration in which at least an outer diameter 54 of receiving portion 52 may be smallest toward a proximate end 56 of vortex finder 50 and may increase toward a distal end 58 that may be disposed in body 30 (e.g., first section 60 may diverge). At least a portion of second section 70 may be disposed in body 30 or a wall of body and at least a portion of second section 70 may be disposed outside of body 30.

In embodiments, a divergent configuration may lessen or eliminate oil impingement and/or entrapment in an air core 120, which in turn can improve oil separation efficiency. For example, as combined fluid 110 enters inlet 20, at least some of the combined fluid 110 may flow toward first/divergent section 60 of vortex finder 50. At least some of the combined fluid 110 that flows to divergent section 60 may be redirected (e.g., outward) via a tapered outer wall 62 of divergent section 60. For example and without limitation, oil 112 that flows to or toward divergent section 60 may be redirected outward toward an outer/side wall or walls 38 of body 30. In such configurations, divergent section 60 may restrict fluid 110 and/or liquid 112 from flowing, at least directly, to air core 120, which may be generally aligned with (e.g., disposed in and/or under) divergent section 60. Restricting the flow of oil 112 into air core 120 may improve the efficiency of removing oil 112 from air 114 that may flow to and out of first outlet 50. With embodiments, vortex finder 50 may be configured such that a length 76 (e.g., an axial length) of vortex finder 50 that extends into body may be at least about 1.5 times as long as a diameter 20D of inlet 20. For example and without limitation, if a diameter 20D of inlet 20 is about 0.5 inches, a length 76 of vortex finder 50 extending into body 30 may be at least about 0.75 inches. In embodiments, a length 66 of first section 60 may be about at least twice as long a length 72 of second section 70 and/or at least three times as long as second section 70. Length 76 of vortex finder 50 extending into body 30 may, for example, include length 66 of first section 60 and at least a portion of length 72 of second section 70.

With embodiments, first section 60 may include an external taper and/or an internal taper. For example and without limitation, an outer surface 62 of first section 60 may be tapered (e.g., an outer diameter 62D of first section 60 may be smallest near a top 32 of body 30 and may increase toward a bottom 34 of body 30) and an inner surface 64 of first section 60 may be tapered (e.g., an inner diameter 64D of first section 60 may be least near a top 32 of body 30 and may increase toward a bottom 34 of body 30). In embodiments, an outer surface 62 of first section 60 may be tapered while an inner surface 64 may not be tapered. A taper of first section 60 may be more gradual than a taper of second section 70 (e.g., first section 60 may include a smaller taper angle α than a taper angle β of second section 70). For example and without limitation, a taper angle β of second section 70 may at least three times larger than a taper angle α of first section 60. With embodiments, length 66 of first section 60 may be similar to diameter 62D of first section. For example and without limitation, length 66 and diameter 62D may be less than and/or about 10% different, less than and/or about 20% different, or may differ by smaller or larger amounts. In embodiments, diameter 62 may be no more than 20% larger than length 66 and/or diameter 62 may be at least 80% as large as length 66.

With embodiments, second section 70 may be connected to first section 60. Second section 70 may include a tapered configuration. For example and without limitation, a diameter 70D of second section 70 may be smallest at a distal end 58 of receiving portion 52 (e.g., at or near first section 60) and may increase toward a proximate end 56 of receiving portion 52 (e.g., second section 70 may converge). A convergent configuration may reduce a pressure drop, such as in high flow rate conditions, which may be present in and/or a result of, for example, over-service conditions. In embodiments, receiving portion 52 may be substantially aligned with a center of body (e.g., with axis 36).

With embodiments, first outlet 50 may include and/or be connected to a fluid valve 80. Fluid valve 80 may be configured as and/or referred to as a pressure relief valve 80. Pressure relief valve 80 may be configured to vent fluid (e.g., air 114 and/or liquid 112) from body 30. For example and without limitation, pressure relief valve 80 may be configured to vent air 114 of air core 120 from body 30. Pressure relief valve 80 may be configured to vent air 114 (e.g. open) if a fluid pressure in body 30 exceeds a preset or predetermined level. A preset or predetermined pressure level may, for example, be about ten pounds of pressure. Pressure relief valve 80 may include a spring 82 that may be configured to keep pressure relief valve 80 closed until a preset or predetermined pressure level is reached. For example and without limitation, spring 82 may apply a biasing force to a poppet 84 of pressure relief valve 80 to keep poppet 84 in a closed position.

In embodiments, such as generally illustrated in FIGS. 1A, 1B, and 2, at least a portion of pressure relief valve 80 may be disposed in vortex finder 50. For example and without limitation, in a closed position, at least a portion of poppet 84 may be disposed in first section 60 and/or second section 70. In some configurations, an end 86 of poppet 84 may extend into body 30 farther than vortex finder 50, at least in a closed position of poppet 84. With embodiments, an inner diameter 64D of first section 60 (e.g., of inner surface 64) may correspond to an outer diameter 80D of portions of pressure relief valve 80 (e.g., an adjusting nut or nuts 88) and/or may be configured to facilitate fluid flow around portions of pressure relief valve 80. A maximum of an inner diameter 64D of first section 60 may be substantially the same as a maximum of inner diameter 70D of second section 70. In embodiments, pressure relief valve 80 may be disposed entirely outside of vortex finder 50 (e.g., above first section 60).

Figure 4:
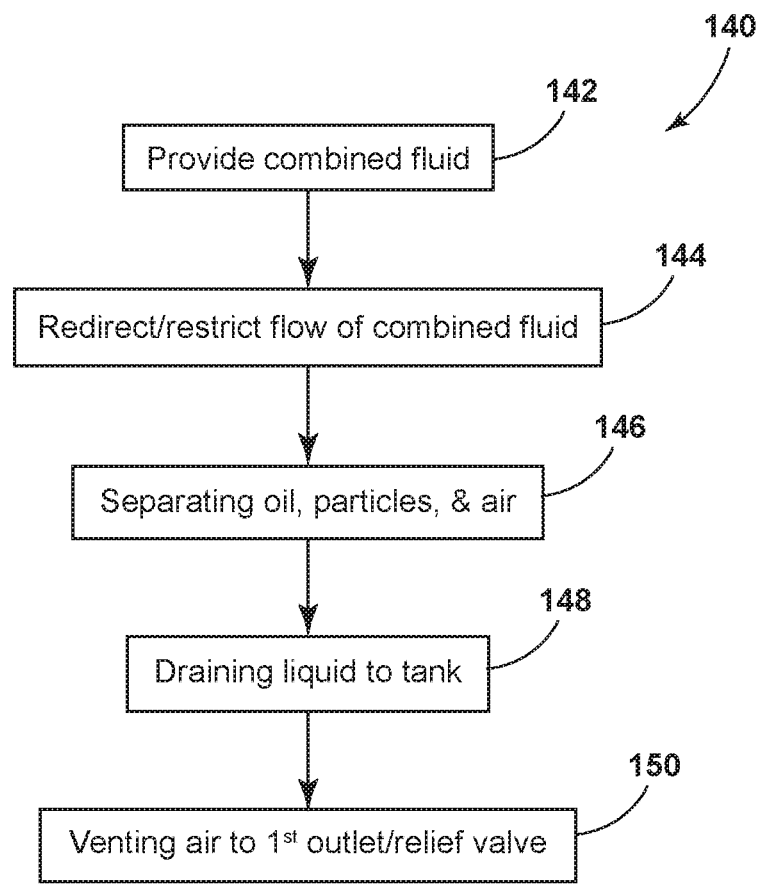
FIG. 4 is a flow chart of an embodiment of a method of separating fluid according to teachings of the present disclosure.

In embodiments, such as generally illustrated in FIG. 4, a method 140 of separating fluid 110 may include providing a fluid separator 10 that may include an inlet 20, a first outlet 50 including a vortex finder having a convergent-divergent configuration, and/or a second outlet 100. The method 140 may include providing a combined fluid 110 to the inlet 20 (step 142). The method 140 may include restricting flow of a combined fluid 110 to and/or restricting flow to the core 120 of gas 114 via divergent section 60 of vortex finder 50 (step 144). The method of claim 140 may include separating a gas 114 from a liquid 112 of a combined fluid 110 (step 146). Separating the gas from the liquid may include creating a core 120 of the gas 114 and/or creating a column 122 of liquid 112. Separating the gas from the liquid may be at least 99% efficient. Gas/air of core 120 may flow into a divergent section 60 of the vortex finder 50. Liquid 112 of column 122 may flow to the second outlet 100 and/or to a tank 132 (step 148). Gas 114 may flow from the divergent section 60 of the vortex finder 50 to a convergent section 70 of the vortex finder 50, which may include limiting a pressure drop. Gas 114 may flow from convergent section 70 to pressure relief valve 80. If a fluid pressure (e.g., in body 30) is sufficiently high, gas 114 may flow through pressure relief valve 80 and/or may exit fluid separator 10 (step 150).

With embodiments, fluid separator 10 may be used in one or more of a variety of applications. For example and without limitation, fluid separator 10 may be used in connection with an aircraft engine (e.g., fluid system 130 may include an aircraft engine) and/or fluid separator 10 may be subject to extreme temperatures. Fluid separator 10 may be configured to withstand temperatures of at least 2000 degrees Fahrenheit for at least five minutes. Inlet 20 of fluid separator 10 may, for example, be connected to a fluid system 130 that may include a scavenge pump that may scavenge the combined fluid 110 from a reservoir and/or engine compartment. Second outlet 100 of fluid separator 10 may, for example, be connected to a fluid tank 132 (e.g., an oil tank).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements, and/or functions of one example may be incorporated into another example as appropriate, unless described otherwise, above. Moreover, many modifications may be made to adapt a particular situation or material to the teachings of the present disclosure without departing from the scope thereof. Therefore, it is intended that the present teachings not be limited to the particular examples illustrated by the drawings and described in the specification, but that the scope of the present disclosure will include any embodiments falling within the foregoing description and the appended drawings.

What is claimed is:

1. A fluid separator comprising:
    a body;
    an inlet;
    a first outlet including a vortex finder including a divergent section and a convergent section connected to the divergent section, the divergent section being at least twice as long as the convergent section; and
    a second outlet;
    wherein a radially outer wall of an axial end of the vortex finder is tapered.

2. The fluid separator of claim 1, wherein the inlet and the first outlet are disposed at a first end of the body, and the second outlet is disposed at a second end of the body.

3. The fluid separator of claim 1, wherein the first outlet includes or is connected to a pressure relief valve.

4. The fluid separator of claim 3, wherein at least a portion of the pressure relief valve is disposed in the vortex finder.

5. The fluid separator of claim 3, wherein the pressure relief valve is disposed entirely outside of the vortex finder.

6. The fluid separator of claim 1, wherein the divergent section is at least three times as long as the convergent section.

7. The fluid separator of claim 1, wherein a maximum inner diameter of the convergent section is substantially the same as a maximum inner diameter of the divergent section.

8. The fluid separator of claim 1, wherein a taper angle of the convergent section is at least twice as large as a taper angle of the divergent section.

9. The fluid separator of claim 1, wherein a maximum diameter of the divergent section is no more than 20% larger than a length of the divergent section and is at least 80% as large as the length of the divergent section.

10. The fluid separator of claim 1, wherein an axial length of a portion of the vortex finder that extends into the body is at least 1.5 times as large as a diameter of the inlet.

11. A method of separating fluid, the method comprising:
    providing a fluid separator having an inlet, a first outlet, and a second outlet, the first outlet including a vortex finder having a divergent section and a convergent section connected to the divergent section, the divergent section being at least twice as long as the convergent section;
    providing a combined fluid to the inlet; and
    separating a gas from a liquid of the combined fluid such that the gas flows into the divergent section of the vortex finder and the liquid flows to the second outlet;
    wherein a radially outer wall of an axial end of the vortex finder is tapered.

12. The method of claim 11, wherein the gas flows from the divergent section of the vortex finder to the convergent section of the vortex finder.

13. The method of claim 11, wherein separating the gas from the liquid is at least 99% efficient.

14. The method of claim 11, comprising at least one of restricting and redirecting flow of the combined fluid via the divergent section of the vortex finder.

15. The method of claim 11, wherein separating the gas from the liquid includes creating a column of the gas.

16. The method of claim 15, comprising restricting flow of the combined fluid to the column of the gas via the divergent section of the vortex finder.

17. The fluid separator of claim 1, wherein the radially outer wall is tapered in opposing directions at the divergent section and the convergent section.

18. The fluid separator of claim 3, wherein the pressure relief valve includes a spring and a poppet, wherein the spring applies a biasing force to the poppet to keep the poppet in a closed position.

19. The fluid separator of claim 18, wherein, in at least the closed position, an end of the poppet extends into the body farther than the vortex finder.

20. The fluid separator of claim 2, wherein one of:
    the convergent section terminates at the first end of the body; or
    the divergent section transitions to the convergent section at the first end of the body.

* * * * *